3,793,416
PROCESS FOR INJECTION MOLDING FOAM SYNTHETIC RESIN MATERIALS INVOLVING INTRODUCTION OF THE EXPANSION AGENT INTO THE METERING ZONE BETWEEN INJECTION MOLDING STEPS

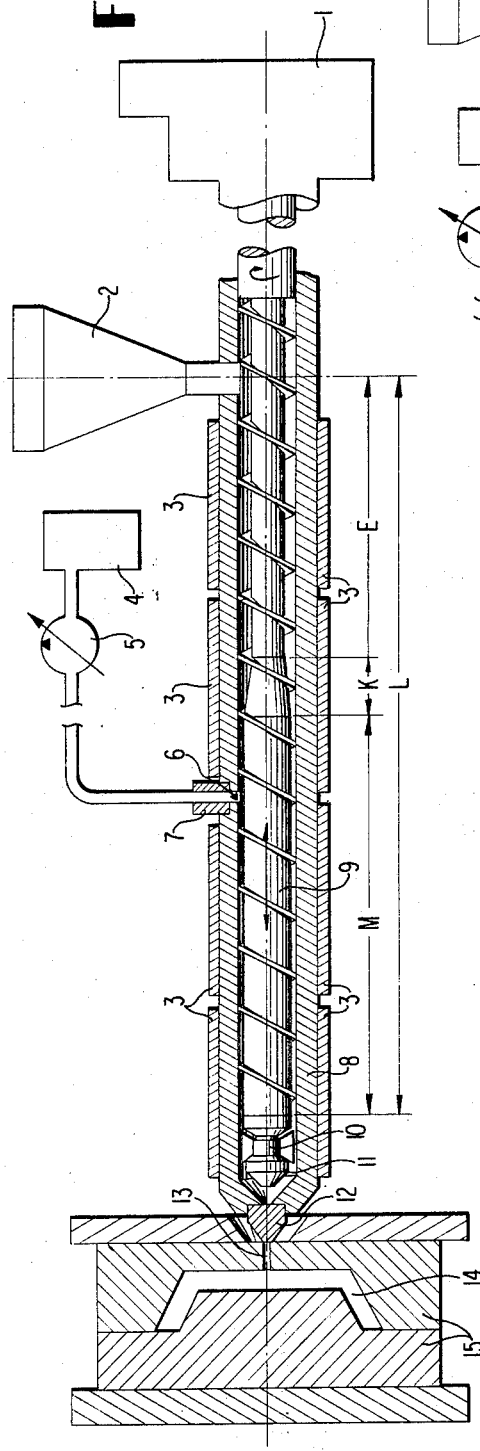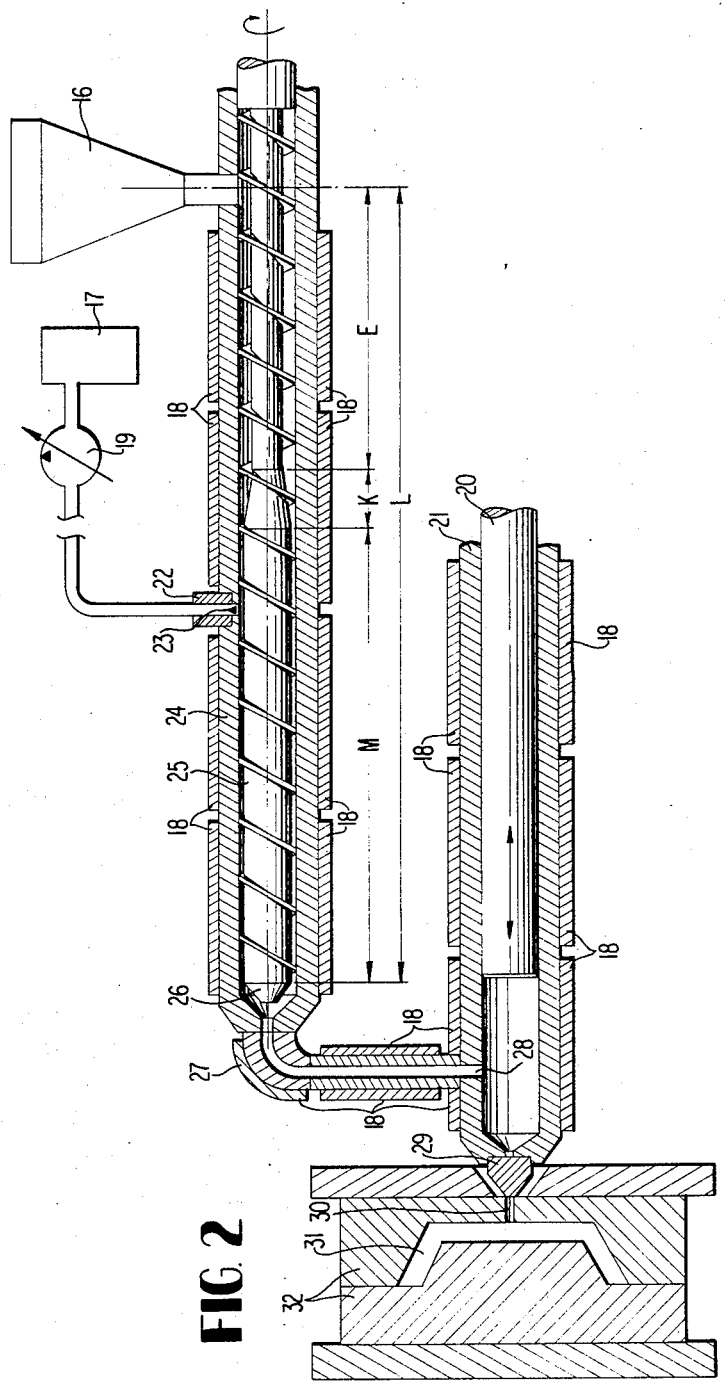

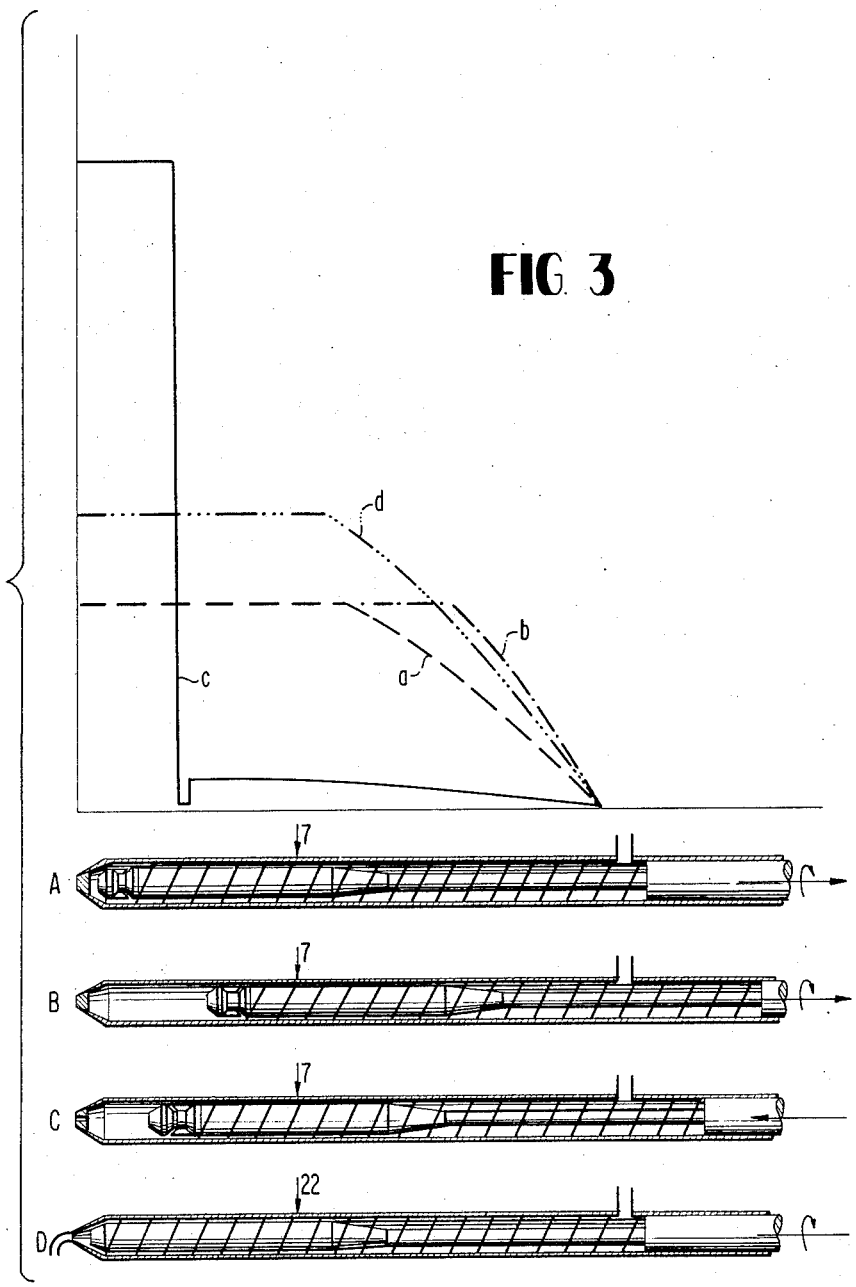

Hans-Ulrich Finkmann, Hans Felger, and Peter Zingsheim, Marl, Germany, assignors to Chemische Werke Huls AG, Marl, Germany
Filed Dec. 24, 1970, Ser. No. 101,249
Claims priority, application Germany, Dec. 24, 1969, P 19 64 748.4
Int. Cl. B29d 27/00; B29f 1/04
U.S. Cl. 264—53                                                     12 Claims

ABSTRACT OF THE DISCLOSURE

The present disclosure is directed to a method for the production of foamed molded articles by injection molding a heat-plasticated mixture of a thermoplastic synthetic material with a low-boiling liquid or gaseous expanding agent in an injection device containing a feed zone, a zone of increasing pressure and a metering zone, wherein a fluid premix of a thermoplastic synthetic material is introduced into the feed zone of the screw barrel chamber of an injection molding device where it is subjected to the effects of heat and pressure and subsequently mixed with an expanding agent introduced into the metering zone of the screw barrel chamber of the injection molding device, said mixture being ejected under high pressure into an injection mold where the mixture expands and foams up in a pressure-expanded fashion forming said foamed molded articles. In this method the expanding agent is introduced after the compression zone of increasing pressure into the metering zone of essentially uniform-remaining pressure of the screw barrel chamber in such a manner that the expanding agent is fed into the screw barrel chamber only during the time interval of plasticating between two successive injection molding steps.

BACKGROUND OF THE INVENTION

The present invention relates to a process for the production of molded articles of a foamed synthetic material by injection molding a heat-plasticated mixture of said synthetic material with low-boiling liquid or gaseous expanding agents wherein first a fluid premix of the synthetic material is prepared by the effect of heat and pressure in the screw barrel chamber of an injection molding machine. This premix is thereafter mixed with an expanding agent fed into the barrel chamber of the injection molding machine and ejected under a high pressure into a cooled injection mold where the mixture foams up due to pressure-expansion and forms the foamed plastic article.

It is conventional according to German published application DAS 1, 181,897 to incorporate a solid expanding agent into the raw material in the form of granules or powder to be processed in accordance with the injection molding method, or to add this expanding agent to the raw material, and to plasticate this mixture under the influence of heat. During this procedure, the expanding agent decomposes, with gas being separated therefrom, but remains in solution under the effect of external pressure and expands the foamable plastic only when the pressure is relieved, that is, after the mixture has entered a cavity mold. This process exhibits the disadvantage that the attainable foam density, when incorporating a constant amount of expanding agent into the plastic which is employed, depends on the volume and the flowpath (wall thickness relationship of the articles to be produced) and consequently the amount of expanding agent must be determined experimentally by complicated preliminary tests for each type and size of molded article to be manufactured. Furthermore, a very nonuniform density distribution over the cross-section and over the length of the flowpath can be observed in the molded article.

Another conventional process, DAS 1,233,578, employs the same type of incorporation of the expanding agent. However, the expander-containing mass is first conveyed into an intermediate container in order to be pressed into the injection mold in a subsequent process step. Therefore, this process not only exhibits the disadvantages of the first-mentioned method, but additionally requires a technically complicated construction.

Furthermore, a process for the production of molded foam articles is conventional according to DAS 1,261,660, wherein the heat-plasticated premix is subjected to low pressure prior to the addition of the expanding agent. At this point, the expanding agent is added, and the total mixture is ejected under high pressure. This process has the disadvantage that a special configuration of the screws is necessary, which screws are very complicated in their design. The further disadvantage can be observed that the expanding agent introduced into zones of lower pressure is not immediately absorbed by the plastic melt, but, rather, is entrained in the form of individual gaseous or liquid bubbles. Additionally, there is the danger that the melt, conveyed against increasing pressure, does not absorb the expanding agent fed thereto, and thus the expanding agent travels backwards against the conveyance of the material and can escape through the feeding hopper. It is impossible to obtain a uniform distribution of the expanding agent with this procedure, and thus strongly differing pore sizes result.

SUMMARY OF THE INVENTION

For the continuous extrusion of expander-containing thermoplastic materials, the suggestion has been advanced in West German patent application P 18 07 534.8 to add the expanding agent to the plasticated premix of a thermoplastic synthetic material in the screw barrel (cylinder) downstream of the zone of increasing pressure, in a zone of pressure which remains substantially the same.

It has now been found that the disadvantages of the previously known injection molding processes in the production of molded articles from foamed plastic can be avoided by adapting the process of feeding and mixing the expanding agent as employed in the continuous extrusion method to the injection molding method in such a manner that it corresponds to the cyclic character of this method.

This problem is solved, in accordance with the present invention, by introducing the expanding agent after the zone of elevated, increasing pressure into the zone of substantally uniform pressure of the screw barrel in such a manner that the expanding agent is introduced into the screw barrel only during the entire time period of plastication set between two successive injection steps.

Suitable apparatus for conducting the present process are screw injection molding machines, as well as plunger-type injection molding machines with screw-type pre-plasticating.

DESCRIPTION OF THE DRAWINGS

FIG. 1 represents a longitudinal section through a schematically illustrated screw-type injection molding machine;

FIG. 2 is a longitudinal section through a plunger injection molding machine with a screw-type preplasticator; and FIG. 3 shows pressure curves $a$, $b$, $c$ along the screw barrel for characteristic screw positions A, B and C of an operating cycle of the screw-type injection molding machine. FIG. 3 also shows the pressure curve $d$ of a plunger injection molding machine with screw-type preplasticator, during the plastication associated with a screw D, which is non-displaceable axially.

DESCRIPTION OF THE PREFERRED EMBODIMENTS

In the process of the present invention for the production of thermoplastic foamed plastic articles, the premix to be foamed is fed, in granular or pulverized form, to the screw-type injection unit (FIG. 1) via the hopper 2 of the screw 9. This premix can contain pore-regulating substances and additives, such as pigments, fillers, flame retardants, and antistats. The screw 9 is axially displaceable in the screw barrel 8 and rotates about its own axis. The screw 9 is driven by the drive mechanism 1. The screw 9 has a length L of 15–25 times the outer diameter of the screw and exhibits successively arranged zones of differing geometry. Zone E represents the feed zone, with a length which is 6–12 times the outer diameter of the screw. Zone K represents the compression zone, also called the conversion zone, and has a length of 0.5–6 times the outer diameter of the screw. Zone M represents the metering zone of the screw 9 and has a length which is 6–10 times the outer diameter of the screw. The screw tip 11 is provided with a backflow blocking means 10 preventing the plasticated mixture from flowing back during the injection thereof through a shut-off nozzle 12 via a sprue 13 into the mold cavity 14 of the injection mold 15. The screw barrel 8 can be heated by means of heating elements 3.

At the beginning of the plasticating process in the screw-type injection molding machine (FIG. 3, A), the pressure in the screw barrel builds up from the hopper 2 of the machine toward the tip of the nozzle and exhibits the course of curve $a$ in FIG. 3. Shortly before termination of the plasticating step (FIG. 3, B), the pressure assumes the curve $b$.

In the zone of the essentially uniform or increasing pressure, the point 7 (FIG. 3, A and B; FIG. 1) is selected for the feed site of the expanding agent into the screw barrel.

The expanding agent is introduced in metered quantities from a storage tank 4 (FIG. 1) with the aid of a metering pump 5 at the inlet nozzle 7, through a back pressure valve 6, into the heat-plasticated premix, the rotating screw 9 moving in the direction toward the drive mechanism 1, due to the force of the accumulating mass in front of its tip.

During this process, the barrel 8 is sealed by means of a shut-off nozzle 12 so that no plasticated melt can escape from the barrel at the barrel end. Once a sufficient amount of melt has been prepared for the production of the article, the screw is arrested by shutting off the screw drive motor in the drive mechanism 1. At the same time, the valve 6 is closed, the pump 5 is cut off, and the metered feeding of the expanding agent for the instantaneous operating cycle is terminated. Thereafter, the screw is shifted axially in the direction of the molding tool 15. The backflow blocking ring 10, which is under a high pressure, seals the melt with respect to the screw, so that no melt can flow across the flights of the screw in the direction toward the feeding hopper 2. The shut-off nozzle 12 is opened, and the melt passes under pressure through the sprue 13 into the mold cavity 14 of the injection mold 15.

FIG. 3, C, shows this position of the screw, and the curve $c$ shows the associated pressure after opening the shut-off nozzle 12 during the injection step into the mold cavity 14 (FIG. 1). Curves $a$, $b$ and $c$ show that the metered feeding point 7 is not under any higher pressure, during the entire cycle, than at the beginning of the metered feed.

In case a plunger-type injection molding machine is employed, with a screw-type preplasticator (FIG. 2), the process of the present invention takes place as follows:

The screw 25 in the cylinder (barrel) 24 rotates only about its own axis and is not axially displaceable. A plunger cylinder 21 with a movable plunger 20 is associated with the screw barrel 24. Both cylinders are heated with the aid of heating elements 18.

In FIG. 3, position D, the screw barrel of this machine is illustrated, wherein the length of the path from the inlet of the hopper 16 to the tip 26 of the screw (see FIG. 2) is drawn in adaptation (to the same scale) to the length of the corresponding path of the screw barrel of the screw-type injection molding machine. Curve $d$ shows the course of the pressure along the thus-represented path during the plasticating step.

This illustration is to clarify that, when using the preplasticizing screw, the point of feeding the expanding agent 22 in the screw barrel zone of the essentially uniform or increasing pressure is selected entirely analogously to the procedure followed in connection with the screw-type injection molding machine of FIG. 1.

The expanding agent is fed in metered quantities from the storage tank 17 with the aid of the metering pump 19 at the feed point 22, via a check valve 23, into the heat-plasticated premix. The preplasticated mass provided with the expanding agent passes from the screw barrel 24 via a duct 27 heated with the heating elements 18 into the plunger cylinder 21 and is from there forcibly conveyed through a shut-off nozzle 29 by way of the sprue 30 into the mold cavity 31 of the molding tool 32, with the aid of the plunger 20. In order to prevent the blackflow of plasticated melt during the injection step from the cylinder 21 via the duct 27 into the screw barrel 24, the cylinder 21 is closed off with respect to the duct 27 by means of a check valve (back pressure valve) 28.

This valve 28 is controlled in dependence on the cycle in such a manner that it is closed at the beginning of the plunger movement in the direction toward the injection nozzle 29 and is again opened upon termination of the injection step.

Simultaneously with the closing of the valve 28, the metering pump 19 for the expanding agent is arrested, and the valve 23 is closed. The actuation of the metering pump 19 and the opening of the valve 23 occur directly after the plunger sealing valve 28 has been opened.

In both types of injection molding machines, the necessary temperature program is dependent on the particular synthetic material employed, and is determined by preliminary experimentation.

Synthetic polymeric materials which can be used in the present invention include those having a relatively low viscosity for the ambient melt temperature at the metering point of the expanding agent and those exhibiting a softening point range which is not too broad. Suitable material include thermoplastic synthetic materials, such as polyolefins, e.g. polyethylene, polypropylene, etc., polyvinyl compounds, e.g. polystyrene, polyvinyl chloride etc., polyamides, e.g. nylon, and the like.

Suitable pore-controlling agents which can be utilized include carbonates and bicarbonates of sodium in mixtures with an organic acid, such as citric acid and optionally with inorganic compounds.

Expanding agents which can be employed in the present process comprise low-boiling, liquid substances, preferably aliphatic hydrocarbons boiling between 20 and 70° C., such as pentane, hexane, etc., or chlorinated hydrocarbons, such as trifluorotrichloroethane, tetrafluorodichloroethane, and monofluorotrichloromethane. In addition to these low-boiling, liquid hydrocarbons, it is also possible to employ gaseous expanding agents, such as propane, butane, etc., by itself or as mixtures, or blends with liquid expanding agents.

The amount of expanding agent to be utilized depends on the size of the article, the thermoplastic synthetic material to be employed, and the foam material density to be attained, as well as on the expanding agent employed in that particular case, and is about 0.1 to 10% by weight, based on the total mixture.

The process of the present invention permits the production of foamed molded articles by the defined metered addition of the expanding agent in dependence on the desired density of the molded article to be produced. In this connection, the process avoids the disadvantages occurring in a continuous introduction of the expanding agent together with the plastic and in an introduction of the expanding agent under low pressure into the heat-plasticated premix, which produces the occurrence of non-uniform densities and the backflow of the expanding agent.

As compared to the injection molding process employing an intermediate container, the process of the present invention has the essential advantage of a simpler technical operation.

The following examples are merely exemplary of the present invention and are not to be considered as limiting the scope of the present invention.

EXAMPLE 1

A screw-type injection molding machine is employed having a screw of a diameter of 45 mm. The screw is subdivided into three zones and has a length of $20x$, wherein $x$ represents the screw diameter. The screw has a feed zone length of $10x$, a compression zone length of $2x$, and a metering zone with a length $8x$. The screw flight depth of the feed zone is 5.8 mm. and the flight depth of the metering zone is 1.5 mm., resulting in a compression ratio of 3.87:1. The tip of the screw is provided with a backflow blocking means, and the screw barrel is equipped at the tip with a spring-loaded shut-off nozzle. The pitch of the screw is $1x$. The point where the expanding agent (in this case, monofluorotrichloromethane) is introduced through the nozzle is at a distance of $2x$ from the beginning of the metering zone, calculated toward the tip of the screw, when the screw is in the frontmost position in the screw barrel.

Polystyrene was processed having a bulk density of 1.05 g. cm.$^3$ according to DIN (German Industrial Standard) 53 479 and a viscosity of 90, measured along the lines of DIN 53 726 (viscosity number) as well as a K-value of 60, measured at 20° C. according to the polyvinyl chloride standard. At a metering path of 117 mm., corresponding to $2.6x$, 170 cc. of melt, the material was processed within 20 seconds, at a barrel temperature adjustment from the feeding hopper to the nozzle which increased from 180° C. to 200° C. to 210° C., and a nozzle temperature of 210° C., with a mass temperature of 226° C. at a screw ram pressure of 60 kp./cm.$^2$. During this preparation of the melt, 2.5 parts by weight of monofluorotrichloromethane was introduced at the above-described feed point into the melt under a pressure of 82 kp./cm.$^2$. The screw speed of rotation was 60 r.p.m. during this plasticating process. Thereafter, under an injection pressure of 800 kp./cm.$^2$, the polystyrene melt, containing the expanding agent in a finely distributed form, was pressed (forced), after the opening of the shut-off nozzle, via a central sprue of 2.5 mm. diameter, into the cavity of a closed and cooled mold. The injection time was 1.2 seconds. The melt foamed only after being deposited into the mold cavity and filled this cavity completely in the foamed condition. After a cooling period of 60 seconds, the article could be removed from the mold. During the cooling-off period of the injection-molded article, the expander-containing melt, which had not yet been expanded, was already prepared in the plasticating unit for the subsequent injection step. The dimensions of the article included a diameter of 250 mm. and a wall thickness of 6.9 mm. The surface of the article was not foamed up to a depth of 0.3 mm., whereas a very uniform pore structure was observed in the interior of the article, with an average pore diameter of 0.15 mm. The average density of the molded article was 0.5 g./cm.$^3$.

EXAMPLE 2

In a plunger-type injection molding machine with screw pre-plasticater, a lil-less box having the dimensions of 250 x 250 mm. with a height of 110 mm. and a wall thickness of 10 mm. is produced via a central rod-shaped sprue having a length of 30 mm. and flaring from 4 to 6 mm. This box has an average density of 0.63 g./cm.$^3$ and is produced of expandable impact-resistant polystyrene (as specified in Example 1). In the screw barrel, a screw is arranged having a screw diameter of 45 mm., with a length of $15x$, with $x$ being the screw diameter. The lengths of the feed and compression zones of the screw amount, in each case, to $3x$, whereas the metering zone has a length of $8x$, at a constant flight pitch of $1x$. The depth of the screw flights in the feed zone is 6 mm., and the flight depth in the metering zone is 1.7 mm., resulting in a flight depth ratio of 3.53:1. The screw cannot be displaced axially. It is driven by the screw drive motor and rotates only about its own axis during the plasticating step. The point where the monofluorotrichloromethane is introduced through the nozzle as the liquid expanding agent is $1.5\ x$ after the start of the metering zone toward the tip of the screw. The screw, which rotates about its axis at 120 r.p.m., plasticates the granulated polystyrene fed via the feeding hopper and forces the same, during this plasticating step, continuously via a heated feed duct provided with a check valve under a pressure of 130 kp./cm.$^2$, into a likewise heated plunger cylinder having an internal diameter of 65 mm.; the plunger moves backwards during this procedure, due to the conveying pressure, against a back pressure which is 1–2 kp./cm.$^2$ lower than the conveying pressure of the screw. The expander-containing melt, which is not yet expanded, is maintained in the plunger cylinder, which is closed off by a shut-off nozzle, under this pressure. For producing the above-mentioned article, the screw plasticates and conveys, at 120 r.p.m. over a period of 42 seconds, about 1,000 cc. of expander-containing melt into the plunger cylinder. The plunger moves backward at the same time over a stroke of 300 mm. During this plasticating and conveying time, an amount of expanding agent of 2.8% by weight, based on the plasticated melt, is introduced with the aid of the expanding agent metering pump, at a pressure of 185 kp./cm.$^2$, at the above-described point of the screw barrel, into the melt. Once the expander-containing amount of melt has passed into the plunger cylinder, the plasticating process is simultaneously arrested by discontinuing the screw rotation, the check valves at the feed point for the expanding agent and in the feed duct to the plunger cylinder are closed, and the shut-off nozzle is opened. The movement of the plunger in the direction toward the nozzle introduces the melt, under a pressure of 850 kp./cm.$^2$, and within a period of 1.8 seconds through the nozzle by way of the sprue into the cooled and clamped box-shaped mold, where the melt is expanded under the effect of the expanding agent pressure, thus filling the entire mold cavity. An unfoamed surface of 0.6 mm. and a core built up from closed cells with an average cell diameter of 0.2 mm. are thus formed. The expanded melt solidifies, and after 85 seconds, the above-described article is removed from the mold. The total density of the article is 0.63 g. cm.$^3$. The total cycle time is 90 seconds. Immediately after forcing the melt into the mold cavity, the shut-off nozzle is simultaneously closed, the metering pump for the expanding agent is actuated, and the screw, at the above-mentioned screw speed, commences with the preparation of the melt for the subsequent injection molding step. Due to the metering pressure of the expanding agent, the check valve at the feed point for the expanding agent is opened and the expanding agent is forced into the melt. Furthermore, the check valve at the feed duct to the plunger cylinder is opened due to the screw conveying pressure of the melt. Additionally, the plunger back pressure is reduced from 850 kp./cm.$^2$ to 128 kp./cm.$^2$, so that the melt fed by the screw can again pass into the plunger cylinder, pressing back the plunger proper. Once a sufficient amount of melt has been prepared, the latter remains in the plunger cylinder under heat until the mold, after removal of the article injection-molded in the previous cycle, is closed again so that the new injection molding step, as described above, can begin. The temperatures in the three heating zones of the screw barrel from the feeding hopper to the tip of the screw are controlled to be 210° C., 210° C., and 210° C., respectively. The feed duct from the screw barrel to the plunger cylinder is provided with two heating zones maintained at a constant temperature of 210° C., and the heating elements of the plunger cylinder are regulated to be at a constant temperature of 250° C. With these temperature values, the melt temperature, measured upon exit from the nozzle of the plunger cylinder, was 223° C.

The invention being thus described, it will be obvious that the same may be varied in many ways. Such variations are not to be regarded as a departure from the spirit and scope of the invention, and all such modifications as would be apparent to one skilled in the art are intended to be included.

What is claimed is:

1. In a method for the production of foamed molded polymeric articles by injection molding a heat plasticated mixture of a thermoplastic synthetic molymeric material suitable for injection molding with a low-boiling organic liquid or gaseous expanding agent or mixtures thereof in an injection device wherein a fluid premix of said thermoplastic synthetic polymeric material is prepared by the effects of heat and pressure in a screw barrel chamber of an injection molding device and the fluid premix is subsequently mixed with said expanding agent and the resultant mixture is ejected under pressure by a screw in said chamber into an injection mold where the mixture expands and foams up in a pressure-expanded fashion to form said foamed molded polymeric articles, the improvement which comprises effecting preparation of said premix in an injection molding device having a feed zone, a compression zone of increasing pressure, and a metering zone of essentially uniform remaining pressure and introducing said expanding agent after the compression zone into the metering zone of the screw barrel chamber only during the time interval of plasticating between two successive injection molding steps.

2. The method of claim 1, wherein the expanding agent is introduced between two successive injection molding steps in a uniform amount per unit of time.

3. The method of claim 1, wherein the injection of the mixture of thermoplastic synthetic polymeric material and the expanding agent is effected by the axial movement of a screw in the screw barrel chamber.

4. The method of claim 3, wherein the screw is not rotating during the injection.

5. The method of claim 1, wherein the mixture of thermoplastic synthetic polymeric material and the expanding agent is introduced into the chamber of a plunger-type injection molding device from where the mixture is injected into the injection mold where the mixture expands and foams up forming said foamed molded polymeric articles.

6. The method of claim 5, wherein the screw is not rotating during the injection of the mixture into the injection mold.

7. The method of claim 1, wherein the expanding agent is introduced at a distance which is greater than the pitch of the screw from the beginning of the metering zone, calculated toward the tip of the screw, when the screw is in the frontmost position in the screw barrel, that said expanding agent does not enter said compression zone.

8. The method of claim 7, wherein the distance of the introduction of the expanding agent is 1.5 times the pitch of the screw.

9. The method of claim 7, wherein the distance of the introduction of the expanding agent is twice the pitch of the screw.

10. The method of claim 7, wherein the screw has a length of 15 to 25 times the outer diameter of the screw, the feed zone has a length of 6 to 12 times the outer diameter of the screw, the compression zone has a length of 0.5 to 6 times the outer diameter of the screw and the metering zone has a length of 6 to 10 times the outer diameter of the screw.

11. The method of claim 7, wherein the screw has a length 20 times the outer diameter of the screw, the feed zone has a length of 10 times the outer diameter of the screw, the compression zone has a length of 2 times the outer diameter of the screw and the metering zone has a length of 8 times the outer diameter of the screw; wherein the screw flight depth of the feed zone is 5.8 mm. and the flight depth of the metering zone is 1.5 mm. resulting in a compression ratio of 2.81 to 1.

12. In a method for the production of foamed molded polymeric articles by injection molding a heat-plasticated mixture of a thermoplastic synthetic polymeric material suitable for injection molding with a low-boiling organic liquid or gaseous expandng agent or mixtures thereof in an injection device wherein a fluid premix of said thermoplastic synthetic polymeric material is prepared and plasticated in a screw barrel chamber of an injection molding device and the plasticated fluid premix is subsequently mixed with said expanding agent and the resulting mixture is ejected under pressure by a screw in said chamber into an injection mold where the mixture expands and foams up in a pressure-expanded fashion to form said foamed molded polymeric articles, the improvement which comprises effecting preparation and plastication of the premix in an injection molding device having sequentially a feed zone, a compression zone of increasing pressure, and a metering zone of essentially uniform remaining pressure and introducing said expanding agent into the metering zone at a distance from the end of the compression zone which is at least equal to the pitch of the screw of the metering zone, mixing the expanding agent with the heat-plasticated premix, wherein said expanding agent is fed into the screw barrel chamber only during the time interval of plasticating between two successive injection molding steps.

References Cited

UNITED STATES PATENTS

| | | | |
|---|---|---|---|
| 3,133,316 | 5/1964 | Arpajian | 264—329 UX |
| 3,140,332 | 7/1964 | Brown | 264—329 |
| 3,191,233 | 6/1965 | Linderoth | 264—329 X |
| 3,396,431 | 8/1968 | Kovach et al. | 264—329 X |
| 3,436,446 | 4/1969 | Angell, Jr. | 264—51 |
| 3,551,947 | 1/1971 | Jennings | 264—40 UX |
| 3,647,309 | 3/1972 | Thompson | 425—162 X |
| 3,658,973 | 4/1972 | Aykanian | 264—53 |
| 3,268,636 | 8/1968 | Angell, Jr. | 264—51 |
| 3,440,309 | 4/1969 | Breukink et al. | 264—53 |
| 3,285,865 | 11/1966 | Del Bene | 264—51 |
| 3,145,240 | 8/1964 | Proulx et al. | 264—53 |
| 3,001,956 | 9/1961 | Meinel | 264—51 |
| 3,162,703 | 12/1964 | Eyles | 264—51 |
| 3,697,204 | 10/1972 | Kyritsis et al. | 264—Dig. 83 |

FOREIGN PATENTS

| | | | |
|---|---|---|---|
| 1,142,230 | 1/1963 | Germany | 264—329 |

OTHER REFERENCES

Whittington, Lloyd R., "Whittington's Dictionary of Plastics," Stamford, Conn. Technomic, © 1968, pp. 18, 179, 180, 181, 221, 251.

Brydson, J. A., "Plastics Materials," Princeton, N.J., D. Van Nostrand, © 1966, pp. 209-212.

"Wire and Cable Coaters' Handbook," 1st edition, Wilmington, Del., E. I. du Pont de Nemours and Co., Inc., © 1968, pp. 18-21; 43-45.

PHILIP E. ANDERSON, Primary Examiner

U.S. Cl. X.R.

264—328, 329, 349, Dig. 5, Dig. 83; 425—249, 817